United States Patent
Welter et al.

(10) Patent No.: US 11,633,718 B2
(45) Date of Patent: Apr. 25, 2023

(54) REMOVAL OF BACTERIA FROM DRINKING WATER VIA FILTRATION

(71) Applicant: instrAction GmbH, Deutschland (DE)

(72) Inventors: Martin Welter, Neckargemünd (DE); Christian Meyer, Schwetzingen (DE); Kristian Lungfiel, Wiesbaden (DE)

(73) Assignee: instrAction GmbH, Mannheim (DE)

( * ) Notice: Subject to any disclaimer, the term of this patent is extended or adjusted under 35 U.S.C. 154(b) by 406 days.

(21) Appl. No.: 16/641,049

(22) PCT Filed: Aug. 1, 2018

(86) PCT No.: PCT/EP2018/070866
§ 371 (c)(1),
(2) Date: Feb. 21, 2020

(87) PCT Pub. No.: WO2019/025488
PCT Pub. Date: Feb. 7, 2019

(65) Prior Publication Data
US 2020/0197908 A1   Jun. 25, 2020

(30) Foreign Application Priority Data
Aug. 1, 2017  (DE) .......................... 102017007273.6

(51) Int. Cl.
| | | |
|---|---|---|
| *B01J 20/26* | (2006.01) | |
| *B01J 20/28* | (2006.01) | |
| *C02F 1/28* | (2023.01) | |
| *C02F 1/50* | (2023.01) | |
| *B01J 20/32* | (2006.01) | |

(52) U.S. Cl.
CPC ....... *B01J 20/267* (2013.01); *B01J 20/28011* (2013.01); *B01J 20/28016* (2013.01); *B01J 20/28054* (2013.01); *C02F 1/285* (2013.01); *C02F 1/50* (2013.01); *B01J 20/3282* (2013.01); *B01J 2220/62* (2013.01); *C02F 2303/04* (2013.01)

(58) Field of Classification Search
CPC .... B01J 20/26; B01J 20/267; B01J 20/28011; B01J 20/28016; B01J 20/28054; B01J 20/3282; B01J 2220/62; C02F 1/285; C02F 1/50; C02F 2303/04
USPC .......................................................... 502/401
See application file for complete search history.

(56) References Cited

U.S. PATENT DOCUMENTS

| | | |
|---|---|---|
| 5,314,968 A | 5/1994 | Frommer et al. |
| 2004/0251190 A1 | 12/2004 | Cumberland |
| 2015/0344520 A1 | 12/2015 | Matsumoto |
| 2017/0304803 A1 | 10/2017 | Meyer et al. |

FOREIGN PATENT DOCUMENTS

| | | |
|---|---|---|
| WO | 0107090 A1 | 2/2001 |
| WO | 2016030021 A1 | 3/2016 |
| WO | 2017089523 A1 | 6/2017 |

OTHER PUBLICATIONS

International Preliminary Report on Patentability for International Application No. PCT/EP2018/070866, dated Feb. 4, 2020, 9 pages.
International Search Report and Written Opinion for International Application PCT/EP2018/070866, dated Sep. 5, 2018, 10 pages.

*Primary Examiner* — Edward M Johnson
(74) *Attorney, Agent, or Firm* — RatnerPrestia

(57) ABSTRACT

The present invention relates to a method for producing biocidal, porous particles of a cross-linked polymer, and to the porous particles that can be produced according to the method of the invention. The invention further relates to porous particles of an amino-group-containing polymer (polyamine) having a relatively low swelling factor. The porous particles according to the invention are used to remove biological contaminants from water and to bind metal-containing ions from solutions. The present invention further relates to a filter cartridge which contains the porous cross-linked polymer particles according to the invention.

6 Claims, 9 Drawing Sheets

REMOVAL OF BACTERIA FROM DRINKING WATER VIA FILTRATION

CROSS-REFERENCE TO RELATED APPLICATIONS

This is the national phase of International Application No. PCT/EP2018/070866, filed 1 Aug. 2018, which claims priority to German Application No. 10 2017 007 273.6, filed 1 Aug. 2017. The disclosure of each of these applications is incorporated herein by reference in its entirety for all purposes.

FIELD OF THE INVENTION

This invention relates to a method for preparation of biocidal, porous particles from a crosslinked polymer and the porous particles themselves which can be prepared in accordance with the method described in this invention. Furthermore, this invention also relates to porous particles from an amino group-containing polymer (polyamine) with a relatively low swelling factor. The porous particles described in this invention are used for the removal of biological impurities from water as well as for bonding of ions containing metal from solutions. This invention also relates to a filter cartridge containing the porous particles from a crosslinked polymer described in this invention.

BACKGROUND OF THE INVENTION

The biological contamination of drinking water is a known problem which is especially critical in warmer regions of the Earth. Wells are also contaminated with bacteria and germs after natural disasters. Frequently, the contamination is countered with the addition of hypochlorine which significantly reduces water quality. Alternatives are ozonization, UV irradiation, membrane filtration and the like.

These methods are in part very energy-intensive (high pressure) and expensive, require the use of chemicals or reduce the water quality in other respects, for example, due to considerable chlorine taste. The water must, if necessary, be boiled or filtered via activated carbon in order to remove the chlorine.

Water purification systems according to the state of the art, as for example water-softening plants, water dispensers with and without purification modules, frequently come under suspicion and need to be cleaned thoroughly. Swimming pools that dispense with chlorination of water and that instead use biological purification steps frequently struggle with bacterial load in the warmer season. In households with a hot water tank this must always be kept above a certain high temperature in order to prevent contamination with listeria. Plants with closed water circuits require also sterilization methods to obtain the water quality, for example in industrial (cooling)water circuits.

In this context the removal of undesired ions containing metal, particularly heavy ions containing metal, from drinking water is also of importance.

WO 2017/089523 and WO 2016/030021 disclose a sorbent for the removal of ions containing metal and heavy ions containing metal from water as well as a preparation method for such a sorbent. However, the materials disclosed in these publications have only little biocidal effect. This is particularly evident in the formation of biofilms on the surface of these materials which leads on the one hand to the reduction of metal-binding capacity and on the other hand is only conditionally suitable for the removal of biological impurities.

SUMMARY OF THE INVENTION

It was therefore the object of the invention to provide an improved sorbent which does not have these disadvantages.

This objective was achieved by a method for preparation of biocidal, porous particles from a crosslinked polymer, in particular a polyamine, comprising the following steps:
(a) providing an aqueous suspension containing a polyamine, a crosslinker, and a porous inorganic substrate in particulate form at a temperature less or equal to 10° C. in a mixer for coating of the inorganic substrates with the polyamine;
(b) cross-linking of the organic polymer in the pores of the inorganic substrate and simultaneous removing of water;
(c) dissolution of the inorganic substrate to obtain the biocidal porous particles of a crosslinked polyamine.

DETAILED DESCRIPTION OF THE INVENTION

Figure 1:
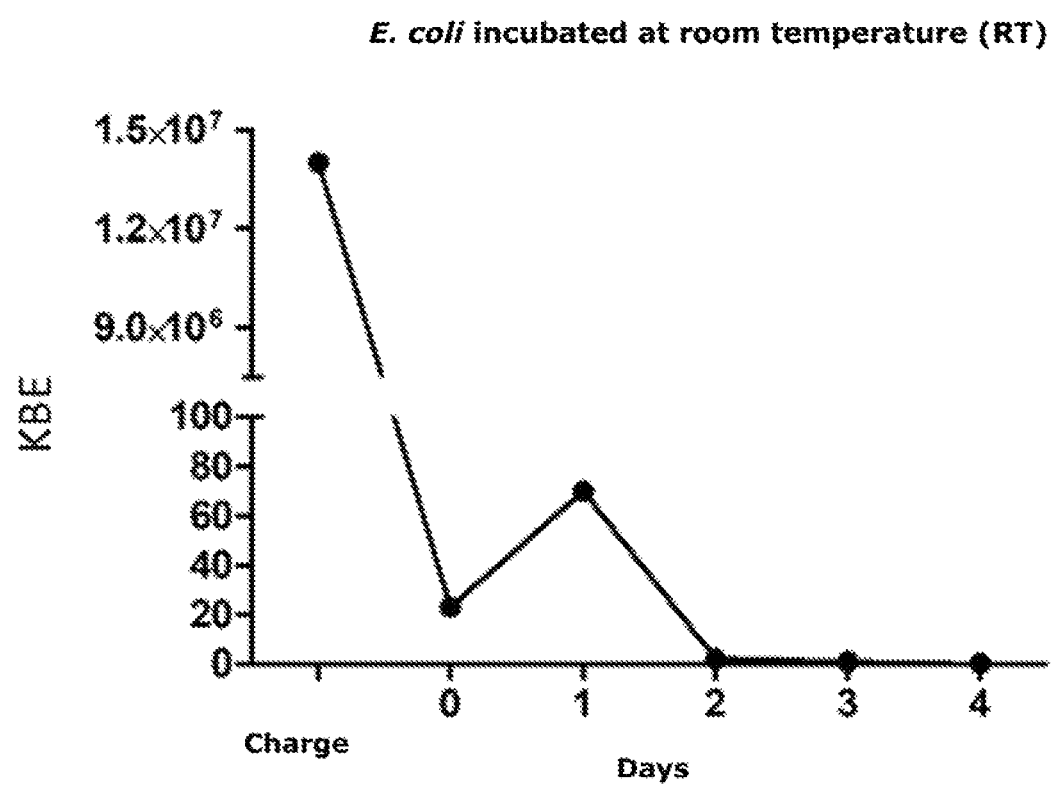
FIG. 1: *E. coli* incubated at room temperature (RT)

A preferred embodiment of this invention is that the steps a) and b) are repeated at least once.

Surprisingly it was found, on the one hand, that by this method a less elaborate preparation method for the sorbent can be provided compared to the state of the art. In addition, the sorbent prepared in such a way does not tend to form biofilms and exhibits a very high biocidal effect against bacteria, germs, yeasts, fungi, or viruses.

The porous particles of a crosslinked polymer can also be referred to as a sorbent in accordance with the invention in the aforementioned sense. Furthermore, the terms polyamine and polymer are used herein synonymously.

In accordance with the invention, the coating and cross-linking is done preferably in a stirred reactor, for example a Lödige mixer. This has the advantage over cross-linking taking place in suspension that the crosslinking can be done in the polymer already partially crosslinked and in uncritical water. In doing so the temperature is increased in step (b) in contrast to the coating from step (a). Crosslinking takes place almost exclusively in the pores of the porous substrates and the solvent water is removed at the same time during crosslinking, so that the step (a) and consequently step (b) can be repeated in the same apparatus. Steps (a) and (b) can be repeated until the desired coating level and density of amino groups is reached. Preferably, coating and crosslinking is done at least twice, however, it can also be done three, four or more times. The preferred option is twice. Preferably, at the end of coating and crosslinking process, i.e. prior to step (c), the temperature is increased to about 60° C. and maintained for about 1 hour.

A preferred embodiment is that the sorbent is post-crosslinked prior to step (c). Preferably, this is done with epichlorohydrin and diaminoethylene at a temperature of 80-90° C., preferably 85° C.

According to another embodiment of the invention the polyamine is used in the non-desalinated state. During the hydrolysis of the polyvinyl formamide accessible through polymerization with sodium lye and the subsequent deadening with hydrochloric acid, cooking salt and sodium formiate are produced. Desalination of the polymer solution is performed by membrane filtration in which the polymer is retained while the salts pass through the membrane layer. Membrane filtration is continued until the salt content, based on ash residue, is less than 1% of the weighed in materials (1% polymer content).

Before this, the polymer is said to be non-desalinated or partially desalinated. Afterwards, the polymer is said to be desalinated.

This saves another purification step. Here, an additional washing step may be required after step (a). However, the costs for the preparation of the coating polymer (e.g. PVA) are reduced dramatically by using a non-desalinated polymer. Thereby, the method will be more economical overall.

By means of the simultaneous addition of a crosslinker to a suspension of an organic polymer at low temperatures of less or equal to 10° C. at the coating (step (a)), a hydrogel is formed directly in the pores of the carriers and the polymer is directly immobilized. When using a non-desalinated polymer, the salts, formed during hydrolysis, can be easily washed out with water. In addition, the subsequent crosslinking due to precrosslinking during the coating, for example, or preferably with epichlorohydrin and diaminoethylene, can be done in aqueous suspension and does not have to be done in the fluidized bed as this has been previously the case in the state of the art. This results in a considerable simplification of the method. Moreover, the use of epichlorohydrin for the implementation of crosslinking in an aqueous suspension has the advantage that unreacted epichlorohydrin is easily hydrolyzed using sodium hydroxide and thus rendered harmless or is converted into harmless substances (glycerin).

Another advantage is that the accessibility and the capacity of the hydrogels for ions containing metal is increased further by the dissolution of the silica gel carrier in step (c). The porous inorganic substrate in particulate form is preferably a mesoporous or macroporous substrate. The average pore size of the porous substrate is preferably in the range from 6 nm to 400 nm, more preferably in the range of 8 to 300 nm, and most preferably in the range of 10 to 150 nm. Furthermore, in relation to industrial applications, a particle size 35 range of 100 to 3000 nm is preferred.

Furthermore, it is preferable that the porous substrate has a pore volume in the range of 30 vol % to 90 vol %, more preferably from 40 to 80 vol %, and most preferably from 60 to 70 vol %, each based on the total volume of the porous substrate. The average pore size and pore volume of the porous substrate can be determined by the pore-fill method with mercury according to DIN 66133.

The porous inorganic material is preferably one that can be dissolved at a pH greater than 10 in aqueous alkaline conditions, more preferably at a pH greater than 11, and most preferably at a pH greater than 12. In other words, the step (c) of the leaching of the inorganic substrate to obtain the porous particles of a crosslinked polymer takes place in said aqueous alkaline conditions. The porous inorganic material is preferably one based on silica or silica gel, or consisting thereof.

The porous inorganic substrate is preferably a particulate material having an average particle size in the range of 5 microns to 2000 microns, more preferably in the range of 10 microns to 1000 microns. The shape of the particles may in this case be ball-shaped (spherical), rod-shaped, lens-shaped, doughnut-shaped, elliptical or also irregular, where spherical particles are preferred.

In step (a) percentage of polymer used is in a range of 5 wt % to 50 wt %, more preferably 10 to 45 wt %, and still more preferably 20 to 40 wt %, each based on the weight of the porous inorganic substrate without polyamine.

The application of the polyamine onto the porous inorganic substrate in particulate form in step (a) of the process according to this invention can be carried out by various methods, such as an impregnation process or by the pore-fill method, wherein the pore-fill method is preferred. The pore-fill method brings with it the advantage over a conventional impregnation processes that a larger total amount of dissolved polymer can be applied in one step onto the porous inorganic substrate, thus increasing the binding capacity and simplifying the conventional method.

In all conceivable methods in step (a) the polymer must be present, dissolved in a solvent. A suitable solvent for the polymer applied in step (a) is one preferably used in which the polymer is soluble. The concentration of the polymer for application onto the porous inorganic substrate is preferably in the range of 5 g/l to 200 g/l, more preferably in the range of 10 g/l to 180 g/l, most preferably in the range of 30 to 160 g/l.

The pore-fill method is generally understood to mean a special coating method, one in which a solution containing the polymer to be applied is applied to the porous inorganic substrate in the amount corresponding to the total volume of the pores of the porous substrate. The total volume of pores [V] of the porous inorganic substrate may be determined by the solvent absorption capacity (CTE) of the porous inorganic substrate. Likewise, the relative pore volume [vol %] can be determined. This is in each case the volume of freely accessible pores of the substrate since only this can be determined by the solvent absorption capacity. The solvent absorption capacity indicates how much volume of a solvent is necessary to fill the pore space of a gram of dry sorbent (preferably stationary phase) completely. As for the solvent, either pure water or aqueous media as well as organic solvents with a high polarity such as dimethylformamide may be used here. If the sorbent increases in volume upon wetting (swelling), the amount of solvent spent for this is recorded automatically. In order to measure the CTE, an accurately weighed amount of the porous inorganic substrate is moistened with an excess of good wetting solvent and excess solvent is removed from the void volume in a centrifuge by rotating. The solvent within the pores of the sorbent remains in the pores due to capillary forces. The mass of the retained solvent is determined by weighing, and this figure is converted into volume via the density of the solvent. The CTE of a sorbent is reported as volume per gram of dry sorbent (ml/g).

While crosslinking in step (b), the solvent is removed by drying the material at temperatures in the range of 40° C. to 100° C., more preferably in the range of 50° C. to 90° C., and most preferably in the range of 50° C. to 75° C. Here, drying is done in particular at a pressure in the range of 0.01 to 1 bar and more preferably at a pressure in the range of 0.01 to 0.5 bar.

The crosslinking of the polyamine in the pores of the inorganic substrate in step (b) of the process in accordance with the invention is preferably carried out such that the degree of crosslinking of the polyamine is at least 10% based on the total number of crosslinkable groups of the polyamine. The degree of crosslinking can be adjusted by the corresponding desired amount of crosslinking agent. For this it is assumed that 100 mol % of the crosslinking agent reacts and forms crosslinks. Regarding the amount of polymer employed, this can be verified by analytical methods such as MAS-NMR spectroscopy and quantitative determination of the amount of the crosslinking agent with respect to the amount of the polymer used. This method is to be preferred in this invention. However, the degree of crosslinking can also be obtained by IR spectroscopy with respect to, for example, C—O—C or OH oscillations using a calibration curve. Both methods are standard analytical methods for a person skilled in this field. The maximum level of crosslinking is preferably at 60%, more preferably at 50%, and most preferably at 40%. If the crosslinking degree is above the specified upper limit, the polyamine coating is not flexible enough. If the degree of crosslinking is below the specified lower limit, the resultant porous particles from the crosslinked polyamine are not rigid enough to be used, for example, as particles of a chromatographic phase or in a water purification cartridge in which higher pressures are also applied in part. If the resulting porous particles from the crosslinked polyamine are used directly as a material for a chromatographic phase, the degree of crosslinking of the polyamine is preferably at least 20%.

The crosslinking agent used for crosslinking has preferably two, three or more functional groups, where the crosslinking is performed by their binding to the polyamine. The crosslinking agent used for cross-linking of the polyamine applied in step (b) is preferably selected from the group consisting of dicarboxylic acids, tricarboxylic acids, urea, bis-epoxides or tris-epoxides, diisocyanates or triisocyanates, dihaloalkyls or trihalogenalkyls and halogenic epoxides wherein dicarboxylic acids, bis-epoxides and halogenic epoxides are preferred, such as terephthalic acid, biphenyl dicarboxylic acid, ethylene glycol diglyceryl ether (EGDGE), 1,12-bis-(5-norbornene-2,3-dicarboximido)-decan dicarboxylic acid and epichlorohydrin, wherein ethylene glycol diglyceryl ether, 1,12-bis-(5-norbornene-2,3-dicarboximido)-decan dicarboxylic acid and epichlorohydrin being more preferred. In one embodiment of this invention the crosslinking agent is preferably a linear molecule having a length between 3 and 20 atoms.

The polyamine used in step (a) has preferably one amino group per repeating unit. A repeating unit is defined as the smallest unit of a polymer that is repeated at periodic intervals along the polymer chain. Polyamines are preferably polymers having primary and/or secondary amino groups. It may be a polymer of the same repeating units, but it also may be a co-polymer, preferably having as co-monomers simple alkene monomers or polar, inert monomers such as vinyl pyrrolidines.

Examples of polyamines are the following: polyamines, such as any polyalkylamines, for example polyvinylamine, polyallylamines, polyethyleneimine and polylysine, etc. Among these polyallylamines are preferred, even more preferred are polyvinylamine and polyallylamine, wherein the polyvinylamine is particularly preferred.

The preferred molecular weight of polyamine used in step (a) of the process in accordance with the invention is preferably in the range of 5,000 to 50,000 g/mol, which applies in particular for the specified polyvinylamine.

By dissolution of the inorganic substrate in step (c) is understood that from the composite particle obtained from step (b) the inorganic substrate is removed from porous inorganic substrate and the applied polyamine. The step (c) of the dissolution of the inorganic substrate to obtain the porous particles of a crosslinked polymer is preferably carried out in an aqueous alkaline solution having a pH greater than 10, more preferably a pH greater than 11, even more preferably a pH greater than 12. An alkali hydroxide, more preferably a potassium hydroxide or sodium hydroxide, most preferably a sodium hydroxide is used as base. It is preferred that the concentration of the alkali hydroxide in the aqueous solution is at least 10 wt %, even more preferably 25 wt % based on the total weight of the solution.

In this case, in step (c) of the method in accordance with the invention the particles obtained in step (b) are brought into contact with the appropriate aqueous alkaline solution for several hours. Subsequently, the dissolved inorganic substrate is washed with water from the porous particles of the crosslinked polymer until the inorganic substrate is substantially no longer included in the product. This has the advantage that when using the porous particles produced in accordance with the invention from of a crosslinked polymer, for example, as a binding material of metals, this consists only of organic material and thus can be combusted completely or without residue of a crosslinked polymer under retention or recovery of the metals in the use.

Furthermore, the cross-linked polyamine according to step (c) may be derivatized in its side groups. Preferably an organic radical is bound to the polymer. This radical can be any conceivable radical, such as an aliphatic or aromatic group, which may also have heteroatoms. These groups may also be substituted with anionic or cationic groups or protonatable or deprotonatable groups. If the porous cross-linked polymer obtained by the inventive process is used to bind metals from solutions, the group, with which the side groups of the polymer are derivatized, is a group which has the property of a Lewis base. By an organic radical which has the property of a Lewis base is meant in particular radicals which undergo a complex bond with the metal to be bonded. Organic groups having a Lewis base are, for example, those having heteroatoms with free electron pairs, such as N, O, P, As, or S.

The ligands shown below are preferred organic radicals for the derivatization of the polymer:

| Name | Structure of the ligand on the polymer |
|---|---|
| 6-aminonicotinic acid groups | 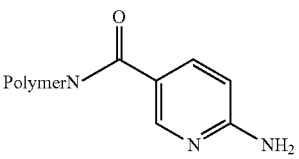 |

-continued

| Name | Structure of the ligand on the polymer |
|---|---|
| Arginine groups | PolymerN-C(=O)-CH(NH₂)-CH₂CH₂CH₂-N=C(NH₂)(NH₂) |
| Succinic acid-N-methyl piperazine | PolymerN-C(=O)-CH₂CH₂-C(=O)-N(piperazine)N-CH₃ |
| 4-[(4-aminopiperzaine-1-yl)amino]-4-oxo-butanoic acid | PolymerN-C(=O)-CH₂CH₂-C(=O)-NH-N(piperazine)N-CH₃ |
| Succinic acid groups | Polymer-N-C(=O)-CH₂CH₂-C(=O)-OH |
| Creatine groups | PolymerN-C(=O)-CH₂-N(CH₃)-C(=NH)(NH₂) |
| Diaminobicyclooctan-carbolic acd | PolymerN-C(=O)-(diazabicyclooctane) |
| Diethylentriamine | PolymerN-CH₂CH₂-NH-CH₂CH₂-NH₂ |
| Diglycolic acid groups | PolymerN-C(=O)-CH₂-O-CH₂-C(=O)-OH |
| Ethylendiamintetraacetic acid groups Connection can be made at 1-4 acid groups | Polymer-NH-C(=O)-CH₂-N(CH₂COOH)-CH₂CH₂-N(CH₂COOH)₂ |
| Ethylphosphonylcarbonyl group | PolymerN-C(=O)-CH₂CH₂-P(=O)(OH)(OH) |

-continued

| Name | Structure of the ligand on the polymer |
|---|---|
| N-ethane thiol groups | 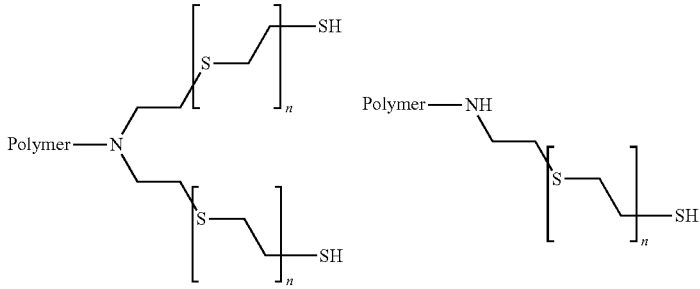 <br> n ≥ 0 |
| N,N-diethane acid groups <br> The chloroacetic acid can mono- or di-substitute the amino group | 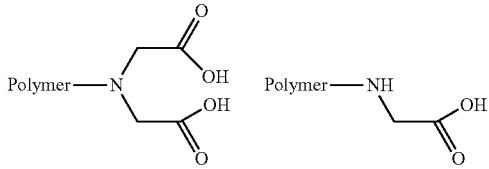 |
| 4-aminobytyric acid groups | 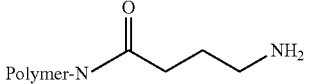 |
| Glutaric acid groups | 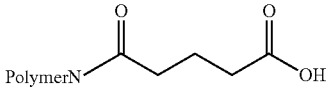 |
| 4-piperidincarboxylic acid groups | 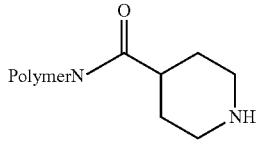 |
| 4-imidazolylacetyl groups | 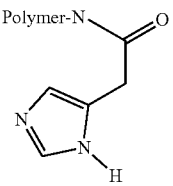 |
| 4-imidazolylacrylic acid groups | 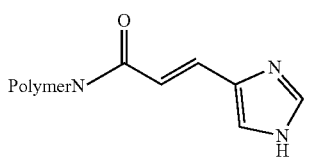 |
| Isonicotinic acid groups | 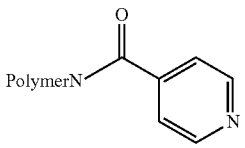 |
| Lysine acid groups | 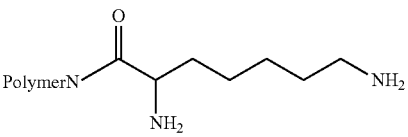 |

-continued
| Name | Structure of the ligand on the polymer |
|---|---|
| Methylthiourea groups | 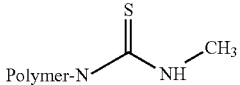 |
| Nitrilotriacetic acid Connection is done via 1-3 carboxylic acid groups | 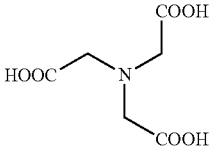 [SMILES: O=C(O)CN(CC(=O)O)CC(=O)O] |
| Phosphoric acid group Can act to crosslink | 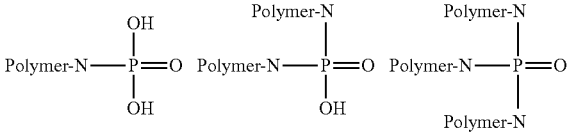 |
| Proline | 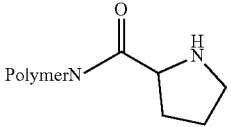 |
| Purine-6-carboxylic acid groups | 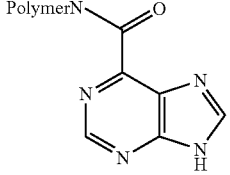 |
| Pyrazine-2-carboxylic acid groups | 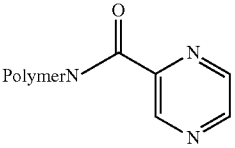 |
| Thymine-N-acetic acid groups | 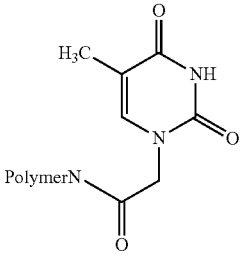 |
| Theophylline-7-acetic acid groups | 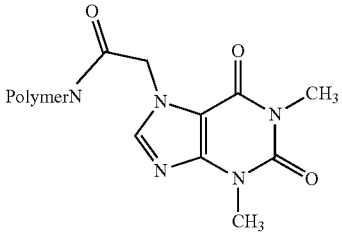 [SMILES: CC(=O)Cn1cnc2c1c(=O)n(C)c(=O)n2C] |
| citric acid groups | 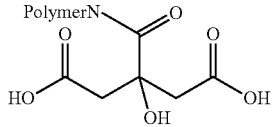 |

More preferably, the ligands are PVA, i.e., the amino group of the PVA, NTA, EtSH, MeSH, EDTA and Inic, or combinations of the above. For example, a combination of PVA with NTA or EtSH is particularly preferred.

Polyvinylamine is particularly preferred to be used as the polymer in the method described in this invention since the amino groups of the polyvinylamine itself constitute Lewis bases and can also be coupled easily by their capacity as nucleophilic groups to a molecule with an electrophilic center. Coupling reactions are preferably used in which a secondary amine and not an amide arises because the Lewis basicity does not become lost by the formation of a secondary amine.

This invention also relates to porous particles of a crosslinked polymer that are obtainable by the above process in accordance with the invention. It is preferred that the particles produced by this process have a maximum swelling factor in water of 300%, assuming a value of 100% for the dry particles. In other words, the volume of the inventive particles may increase in water to a maximum of three times by volume.

Another subject of this application takes the form of porous particles from a crosslinked polyamine, whereby these particles also have a maximum swelling factor of 300%, assuming that the percentage of the dry particles is 100%. In other words, these porous particles of the invention can have a maximum volume increase by three times in water at swelling.

It is, however, more preferred that the particles produced according to the process of this invention or the particles in accordance with the invention have a maximum swelling factor in water of 250%, even more preferred 200%, and most preferred less than 150% since otherwise at least the rigidity of the particles obtained for chromatographic applications is not sufficiently high under pressure.

The biocidal, porous particles prepared according to the inventive process are preferably prepared from a crosslinked polyamine. The polyamine or the porous particles consisting thereof preferably have a concentration determined by titration of the amino groups of at least 300 μmol/ml, more preferably of at least 600 μmol/ml, and even more preferably of at least 1000 μmol/ml. The concentration determined under titration of the amino groups is understood to be the concentration which is obtained according to the analytical methods as described in the example part of this application by breakthrough measurement with 4-toluenesulphonic acid.

The particles created in accordance with this invention preferably have a dry bulk density ranging from 0.25 g/ml to 0.8 g/m, even more preferably from 0.3 g/ml to 0.7 g/ml. In other words, the porous particles are, in overall terms, exceptionally light particles, a quality that is assured by the resulting high porosity. Despite the high porosity and low weight of the particles, these have a relatively high mechanical strength or rigidity and can also be used in chromatographic applications as phases under pressure.

The average pore size determined by inverse size-exclusion chromatography of the porous particles prepared in accordance with the invention, or preferably in the range of 1 nm to 100 nm, more preferably of 2 nm to 80 nm, again in accordance with the invention.

The biocidal, porous particles prepared in accordance with the invention are preferably particles having a similar shape as the leached porous inorganic substrate but with the proviso that the biocidal, porous particles in accordance with the invention substantially reflect with their material the pore system of the leached porous inorganic substrate, i.e. in the case of the ideal pore filling in step (b) of the method described in this invention, they are the inverse image of pores of the porous inorganic substrate used. The biocidal, porous particles of the invention or in accordance with the invention are preferably in a predominantly spherical shape. The average particle size of those is preferably in the range from 5 μm to 1000 μm, more preferably in the range of 20 to 300 μm.

Furthermore, the biocidal, porous particles from the crosslinked polymer defined in this invention are characterized in that they essentially consist of the crosslinked polymer. "Substantially" in this case means that only inevitable residues of, for example, inorganic substrate may be included in the porous particles, where their proportion, however, is preferably less than 2000 ppm, even more preferably less than 1000 ppm, and most preferably less than 500 ppm. In other words, it is preferred that the biocidal, porous particles in accordance with the invention from the crosslinked polymer is substantially free of an inorganic material such as, for example, the material of the inorganic substrate. This is also meant in conjunction with step (c) above of the process in accordance with the invention when it is said that the inorganic substrate is essentially no longer included in the product.

Another embodiment of this invention relates to the use of the biocidal, porous particles of the invention or the biocidal, porous particles prepared in accordance with the invention and for removal of biological contaminants and for the separation of ions containing metal from solutions, particularly from water. In this case, the biocidal, porous particles in accordance with the invention or the biocidal, porous particles prepared in accordance with the invention are preferably used in filtration processes or a solid phase extraction which allow for the removal of biological contaminants or the separation of ions containing metal from solutions. The material in accordance with the invention may be used, for example, in a simple manner in a stirred tank or in a "fluidized bed" application in which the composite material is simply placed in a biologically contaminated and metal-containing solution and stirred for a certain time.

This invention also relates, for example, to a filter cartridge for the treatment of drinking water which contains the biocidal, porous particles from a cross-linked polymer, in accordance with the invention. The filter cartridge is preferably formed such that the reprocessed drinking water can pass through the cartridge where it comes into contact in its interior with the porous particles of a crosslinked polymer, as defined in this invention, where biological contaminants are removed and ions containing metal are removed from the water.

The filter cartridge may additionally contain a material for the removal of micro-pollutants. For this purpose, activated carbon is preferably used. The different materials can be arranged in separate zones within the filter cartridge or in a mixture of the two materials. The filter cartridge can also include several different materials (with and without derivatization) which were prepared in accordance with the method described in this invention.

The filter cartridge can be designed in all conceivable sizes. For example, the filter cartridge may be configured in a size sufficient for the daily drinking water needs of a household. However, the filter cartridge can also have a size that allows to cover the drinking water needs for several households, that is, for example, a requirement of more than 5 liters per day.

The filter cartridge can, for example, have the form of a linear through-flow cylinder or the form of a radially through-flow hollow cylinder.

This invention will now be explained using the following examples. However, these are to be regarded only as exemplary:

EXAMPLES

Analytical Methods:

Determination of the concentration of amino groups of a sorbent with breakthrough measurement with 4-toluenesulphonic acid (titration analysis):

The dynamic anion exchange capacity is determined with a column of the stationary phase to be tested. At first, for this all exchangeable anions are replaced in the column with trifluoroacetate. Then, the column is purged with an aqueous reagent solution of toluene-4-sulphonic acid until this solution exits in the same concentration at the end of the column (breakthrough). From the concentration of toluene-4-sulphonic acid solution, the flow rate and the area of the opening in the chromatogram, the amount of toluene-4-sulphonic acid bound by the column is calculated. The amount of toluene-4-sulfonic acid thus determined indicates the concentration of the amino groups of the sorbent.

The dynamic anion exchange capacity for toluene-4-sulfonic acid in water is based on the phase volume and reported in millimoles per liter (mM/1).

Example 1: Preparation of Porous Particles of a Crosslinked Polymer in Accordance with the invention:

Preparation of Polymer Adsorbate 800 g substrate (Grace silica gel SP542-12110) is directly sucked into Lödige VT5. The silica gel is tempered to 10° C. The mixer is operated at a speed of 120 rpm. Then 1133 g of polymer solution PC 16012 (polymer content of 12%) cooled to 10° C. is weighed into a vessel and mixed with 27.5 g EGDGE (ethylene glycol diglycidyl ether). The mixture is added within 2 minutes to the mixer and mixed for 1 hour at 10° C. Subsequently, the polymer adsorbate is dried at 80° C. and 50 mbar (about 2 hrs). Then, the polymer adsorbate was cooled down to 10° C.

For the second coating, 733 g polymer solution PC 16012 (polymer content of 12%) cooled to 10° C. were weighed into a vessel and mixed with 18 g EGDGE. The polymer solution was filled into the mixing drum within 2 minutes. The polymer adsorbate was mixed for 1 hour at 10° C.

Subsequently, the temperature in the Lödige was raised again to 65° C. for 1 hour. The polymer adsorbate was mixed with 4 liters of fully desalinate water and the suspension from the Lödige VT was directed into a suction filter. There, the polymer adsorbate was washed with 10 BV of fully desalinated water.

Crosslinking 1 liter of sedimented polymer adsorbate is added with 500 liters of fully desalinated water into a 2.5 liter reactor and heated with stirring to 85° C. Subsequently, 125 g epichlorohydrin are added slowly, such that the temperature in the reactor does not exceed 90° C.

Subsequently, stirring is continued for 20 minutes before 83 g of diaminoethylene are added slowly. After another 20 minutes, a further 125 g of epichlorohydrin are added. Then a further 83 g of diaminoethylene 25 are added. Finally, a further 125 g of epichlorohydrin are added. Then the reaction continues to be stirred for 20 minutes at 85° C. The reaction mixture is then cooled down to 25° C. and 500 mL of 50% NaOH are added and stirring is continued for another hour.

The template phase is then transferred to a suction filter and washed using the following solvents:

3 BV 1 M NaOH

3 BV water

3 BV 2 M HCl

3 BV water

6 BV 1 M NaOH

6 BV water

The product is obtained as a moist filter cake.

Example 2: Metal Purification with Simultaneous Removal of Bacteria

Metal purification attempts according to WO 2017/089523 and WO 2016/030021 were performed with a sorbent according to the state of the art as well as with the above prepared sorbent where the solutions used were contaminated additionally with bacterial strains of *Escherichia coli*, *Enterococcus faecalis*, *Pseudomonas aeruginosa* and *Staphylococcus*. An identical performance is shown for metal purification as for non-contaminated solutions. After purification, however, bacteria could no longer be detected in the purified solution. Biofilm formation failed to materialize as well. However, the conventionally prepared material shows biofilm formation and still large amounts of bacterial strains after filtration. Furthermore, the conventional material loses significantly in capacity probably due to biofilm formation.

Application Examples (A):

Example A1: Removal of *E. coli* from drinking water

Add 7 ml of a solution of *E. coli* with a bacterial load of $OD_{600}$ $1 \times 10^7$ CFU/ml with a flow rate of 0.5 ml/min to each of two cartridges (bed volume 7 ml) with bacteriocidal instrAction resin and flush each with 14 ml of water. The eluates are then captured and examined for bacterial load in the following manner:

The captured fractions are centrifuged for 12 minutes (4500 rpm). The resuspended residue and the surplus are plated on LB Agar. These plates are incubated overnight at 37° C. and the resultant colonies are counted.

The cartridges are washed overnight at room temperature and at 37° C. and again on the next day with 14 ml (2 BV) of sterile water. The throughput is captured again and is again analyzed for bacteria, as described above. This process is repeated for 4 days. The following table shows the outcome of these investigations:

TABLE A1

Incubation of *E. coli* in a 7 ml cartridge filled with BacCap resin at different temperatures.

| Bacteria | °C. | Flow rate surplus (CFU) | Flow rate pellet (CFU) | Surplus wash solution (CFU) | Wash solution pellet (CFU) | Loaded bacteria (CFU) | Residue [%] |
|---|---|---|---|---|---|---|---|
| | RT | 0 | 0 | 0 | 23 | $1.4 \times 10^7$ | 99.9% |
| | 37 | 0 | 3 | 0 | 1 | | 99.9% |

Figure 2:
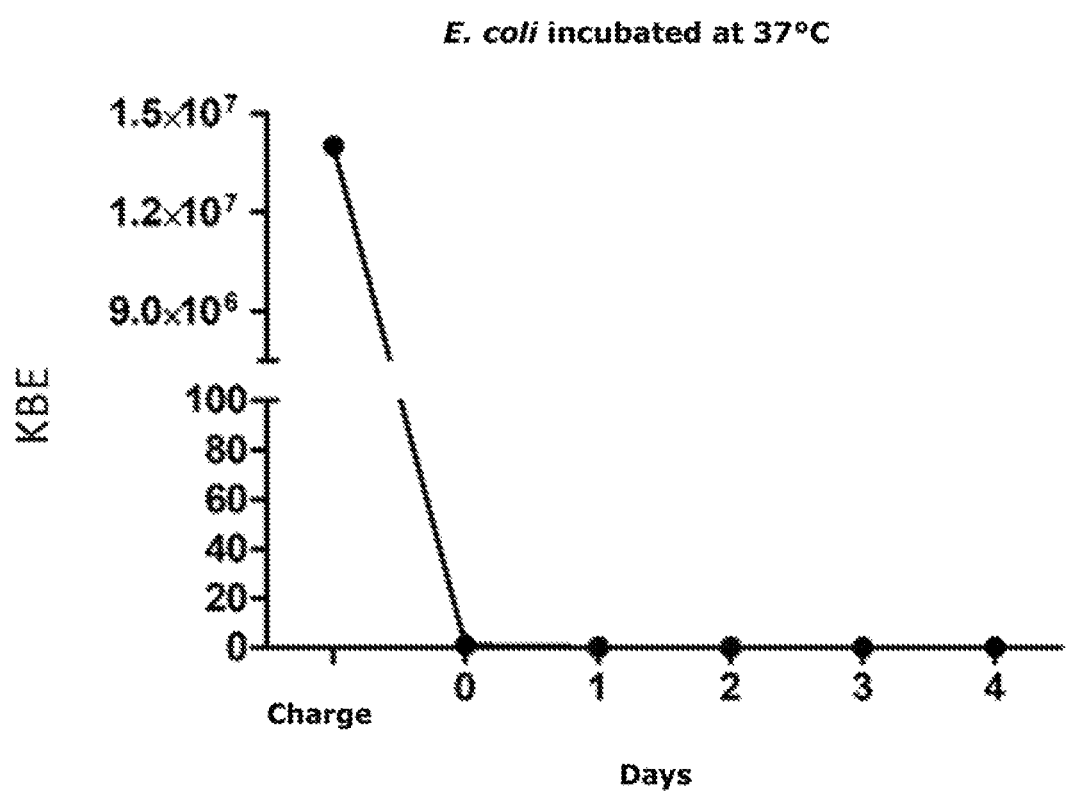
FIG. 2: *E. coli* incubated at 37° C.

FIGS. 1 and 2 illustrate the characteristics over a four-day period.

The 7 ml cartridge, filled with instrAction resin bonds firmly and irreversibly $1.4 \times 10^7$ CFU *E. coli* over a period of four days regardless of whether or not the cartridge is incubated at room temperature or at 37° C.

Example A2: Removal of *Enterococcus faecalis* from water

Add 7 ml of a solution of *Enterococcus faecalis* with a bacterial load of $3.2–3.9 \times 10^8$ CFU/ml with a flow rate of 0.5 ml/min to each of two cartridges with bacteriocidal instrAction resin and flush each with 14 ml of water. The eluates are then captured and examined for bacterial load in the following manner:

The captured fractions are centrifuged for 12 minutes (4500 rpm). The resuspended residue and the surplus are spread onto Blood Agar plates.

These plates are incubated overnight at 37° C. and the resultant colonies are counted.

The cartridges are washed overnight at room temperature and at 37° C. and again on the next day with 14 ml (2 BV) of sterile water. The throughput is captured again and is again analyzed for bacteria, as described above. This process is repeated for 4 days. The following table shows the outcome of these investigations:

TABLE A2

Incubation of *E. faecalis* in a 7 ml cartridge filled with BacCap resin at different temperatures.

| Elution agent | °C. | Flow rate surplus (CFU) | Flow rate pellet (CFU) | Surplus wash solution (CFU) | Wash solution pellet (CFU) | Loaded bacteria (CFU) | Residue [%] |
|---|---|---|---|---|---|---|---|
| *E. faecalis* | RT | 0 | 0 | 0 | 23 | $1.4 \times 10^7$ | 99.9% |
| *E. faecalis* | 37 | 0 | 3 | 0 | 1 | | 99.9% |

Figure 3:
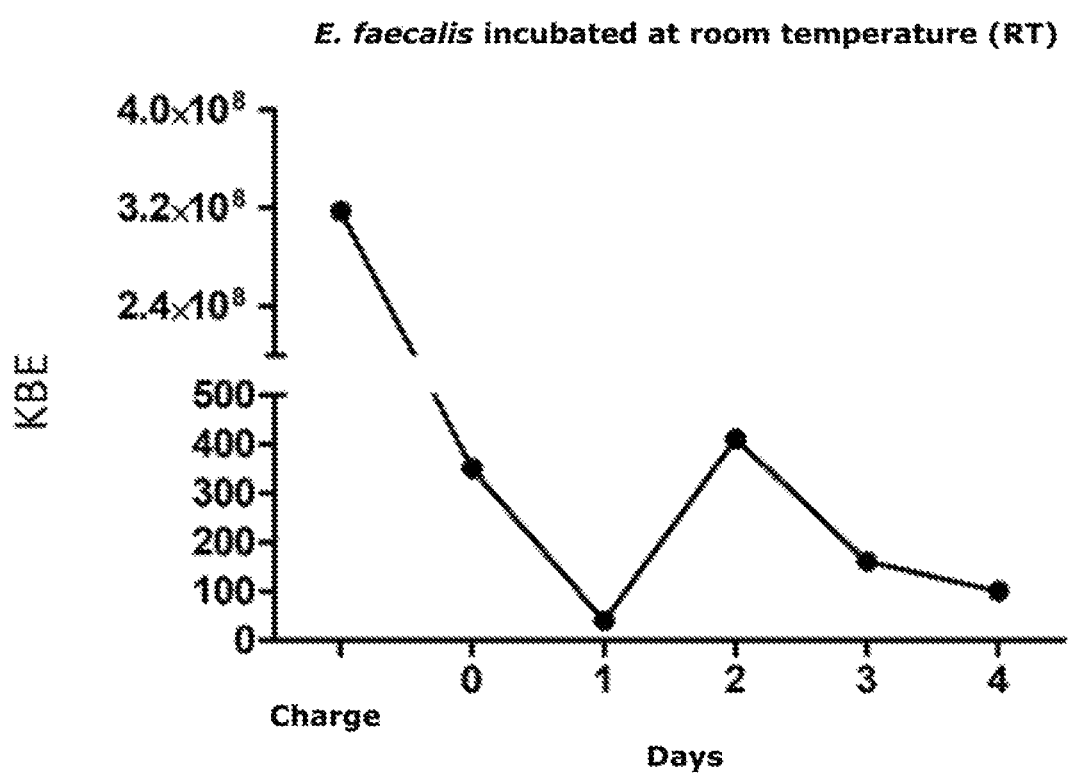
FIG. 3: *E. faecalis* incubated at room temperature (RT).
Figure 4:
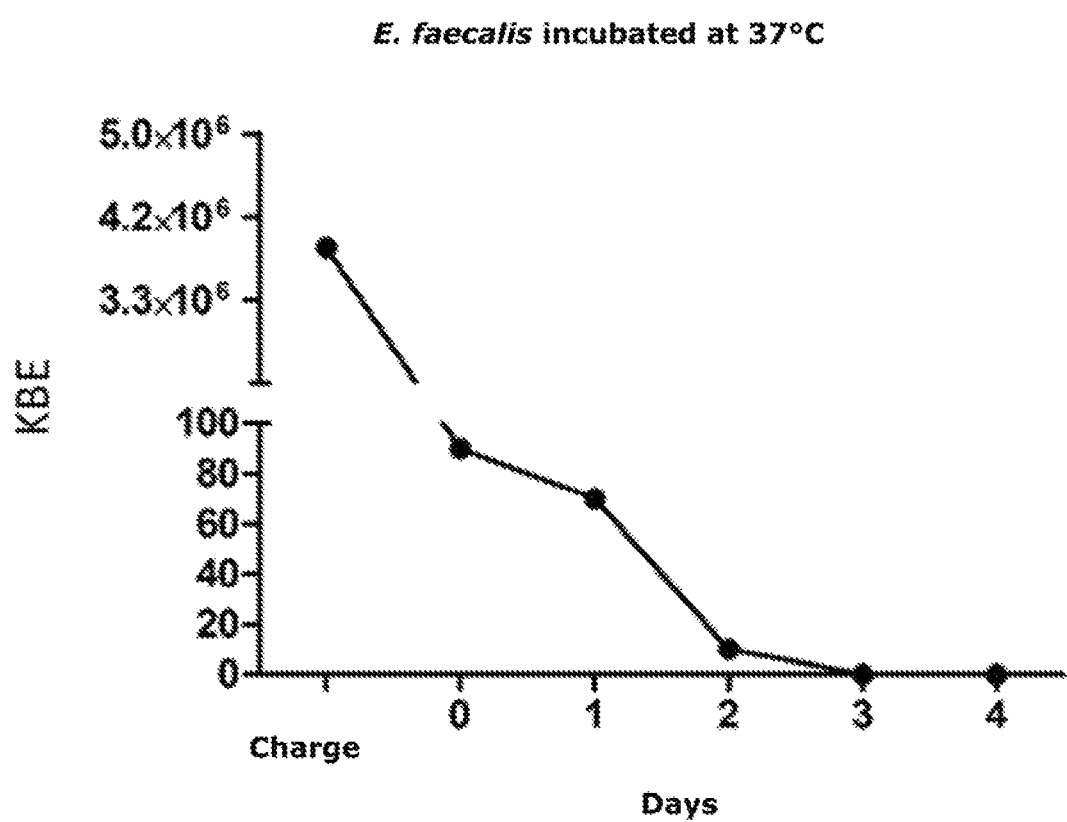
FIG. 4: *E. faecalis* incubated at 37° C.

FIGS. 3 and 4 illustrate the characteristics over a four-day period.

The 7 ml cartridge, filled with instrAction resin bonds firmly and irreversibly $1.4 \times 10^7$ CFU *E. faecalis* over a period of four days regardless of whether or not the cartridge is incubated at room temperature or at 37° C.

Example A3: Removal of *E. coli* from Sterile Water and Drinking Water

Two cartridges are prepared and treated as above, and loaded with *E. coli* ($3–5 \times 10^6$ CFU), in one case using sterile water and in the other case using drinking water as a flushing and elution solution. The cartridges are flushed on two consecutive days:

The following table shows the outcome of this investigation:

TABLE A3

Removal of *E. faecalis* from sterile water and drinking water using cartridges filled with BacCap resin.

| Elution agent | Flow rate resistance (CFU) | Flow rate pellet (CFU) | Surplus wash solution (CFU) | Wash solution pellet (CFU) | Bacterial load (CFU) | Residue [%] |
|---|---|---|---|---|---|---|
| Drinking water | 0 | 0 | 0 | 0 | $2.9 \times 10^6$ | 100% |
| Sterile water | $2.9 \times 10^3$ | 260 | $1.3 \times 10^3$ | 80 | $5.5 \times 10^6$ | 99.9% |

*E. coli* bacteria are retained irrespective of the detergent used (sterile water or tap water).

Figure 5:
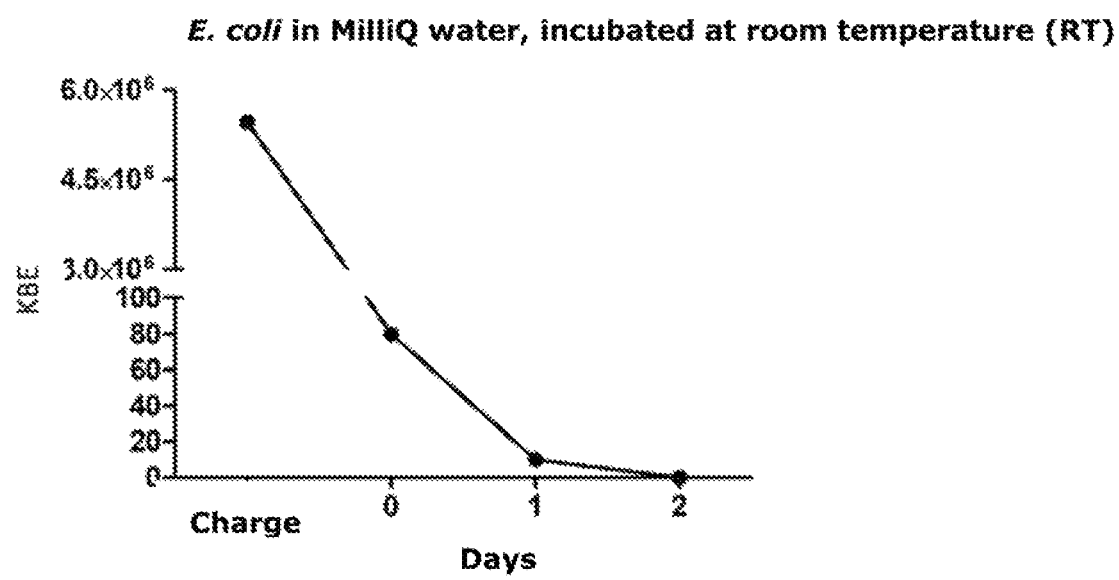
FIG. 5: *E. coli* in MilliQ water, incubated at room temperature (RT).

FIG. 5 illustrates the outcome over two days for the washing operation with sterile water.

Figure 6:
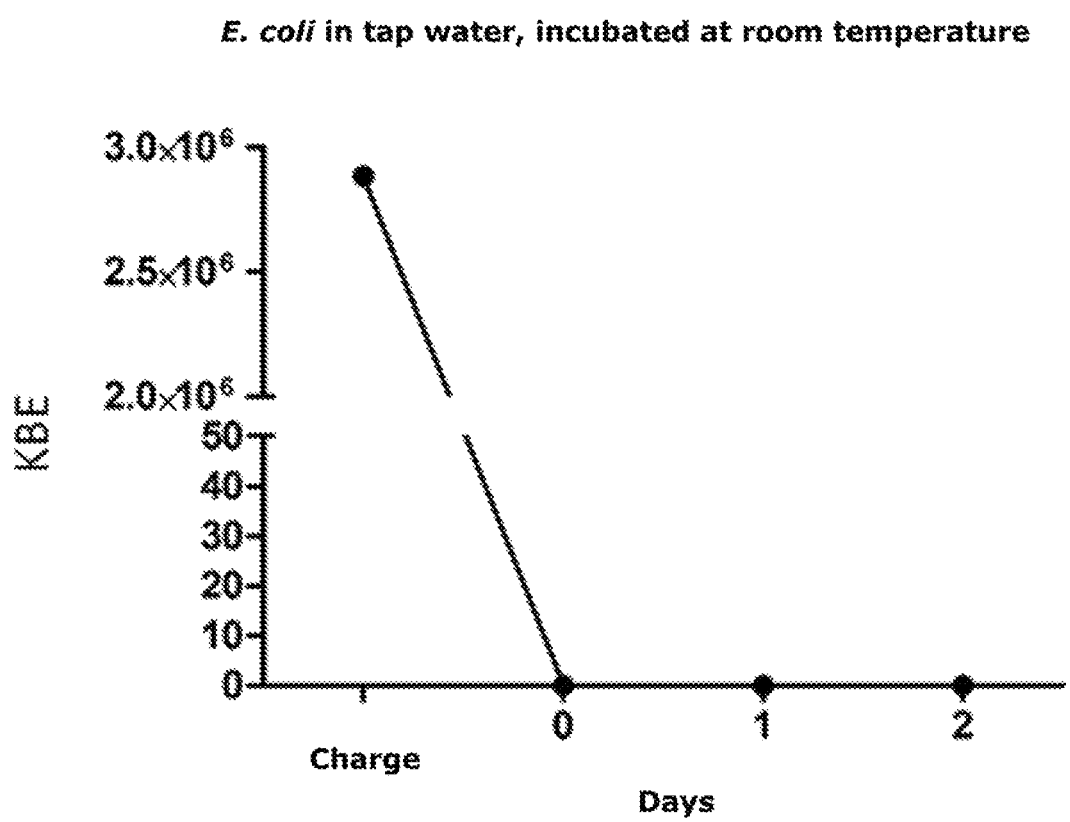
FIG. 6: *E. coli* in tap water, incubated at room temperature.

FIG. 6 illustrates the outcome over two days for the washing operation with tap water.

The application-related outcomes demonstrate that the quantity of *E. coli* added to drinking water can be removed safety and completely.

Figure 7:
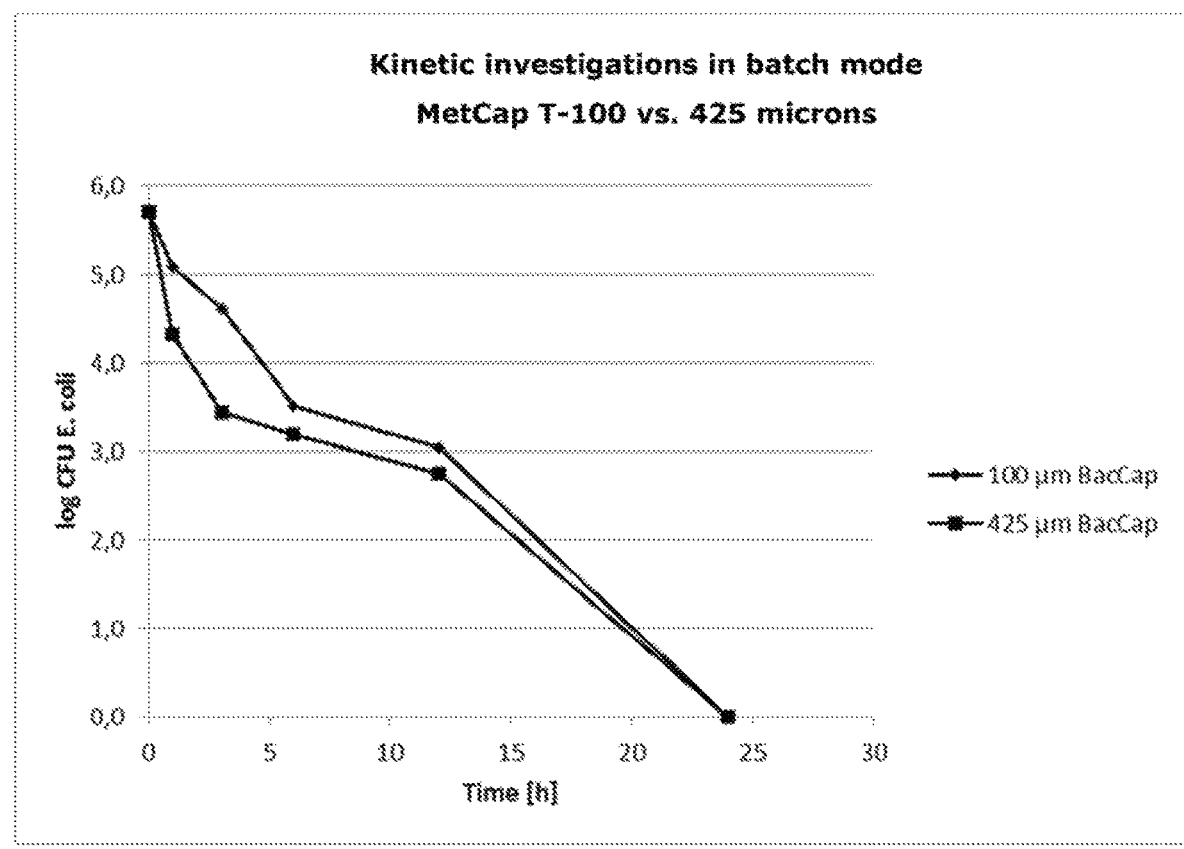
FIG. 7: Kinetic investigations in batch mode MetCap T-100 vs. 425 microns.

Example A4: Kinetic Investigations of Two InstrAction BacCap T-Resins with Different Particle Sizes in the Batch Process:

A suspension of 1 ml $1 \times 10^6$ CFU *E. coli* $DH_{5alpha}$ in 1 l ml of tap water is added to 500 mg of instrAction BacCap resin (batch BV 16037: 100 microns and BV 16092: 425 microns) and is incubated at room temperature on a rotary agitator for 25 hours. At the following intervals, samples are taken and examined with the help of LB Agar plates for colony-forming units: 0, 1, 3, 6, 12 and 25 hours. The outcome of these investigations is shown in FIG. 7:

Both resins exhibit similar kinetic characteristics in the reduction of bacterial concentration over time, regardless of their particle size.

This outcome demonstrates that this is a general principle governing the action of instrAction MetCap T resins. The antibacterial action occurs independently of particle size and therefore of the initial silica gel.

From data, a half-life of approx. 10-15 minutes can be estimated.

Example A5: Comparison with Commercial Resins

Cation and anion exchangers as well as a blank polystyrene resin are used in the drinking water sector to soften water hardness and to remove pollutants. For this reason, a quartary ammonium anion exchanger and a sulfonated polystyrene cation exchanger and a pure polystyrene are investigated in a comparison with BacCap resins.

Pure polystyrene proved to be non-wettable with the bacterial suspension and was therefore not examined any further.

A suspension of 1 ml $1 \times 10^6$ CFU *E. coli* $DH_{5alpha}$ in 1 l ml of tap water is added to 500 mg of instrAction BacCap resin (batch BV 16092: 425 microns) and an anion exchanger (PRC 15035, 500 microns of sulfonated polystyrene) and an anion exchanger (Lewatit M 800) and incubated at room temperature on a rotary agitator for 25 hours.

At the following intervals, samples are taken and examined with the help of LB Agar plates for colony-forming units: 0, 6, 12 and 24 hours.

Figure 8:
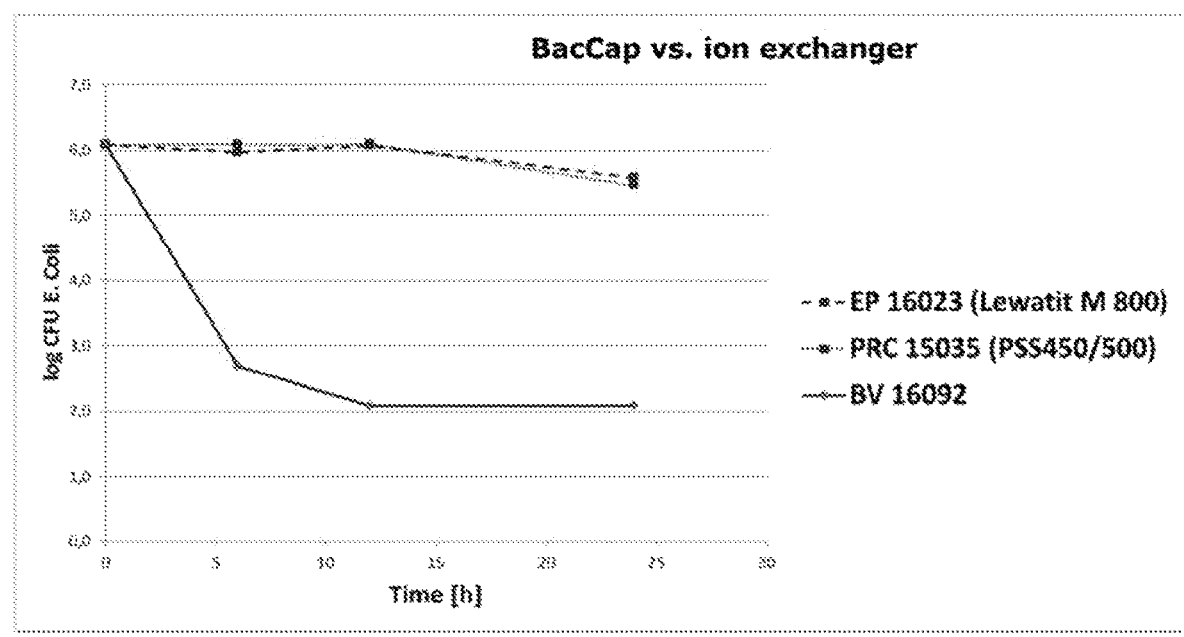
FIG. 8: BacCap vs. ion exchanger.

The outcome of these investigations is shown in FIG. 8:

The BacCap material (500 microns) reduces the bacterial concentration within 6 hours by 4 log stages while the simple ion exchanger (sulfonated polystyrene as a cation exchanger and quaternary ammonium to polystyrene as an anion exchanger) shows no signs of a reduction.

This is in line with the formation of a biofilm known in the literature relating to commercial ion exchangers.

Example A6: Estimation of Capacity

A suspension of 1 ml $1\times10^6$ CFU *E. coli* $DH_{5alpha}$ in 11 ml of tap water is added to 50, 100 and 250 mg of instrAction BacCap resin (batch BV 16037: 100 microns) and incubated at room temperature on a rotary agitator for 25 hours. At the following intervals, samples are taken, are plated and then examined for colony-forming units: 0, 6, 12 and 24 hours.

Figure 9:
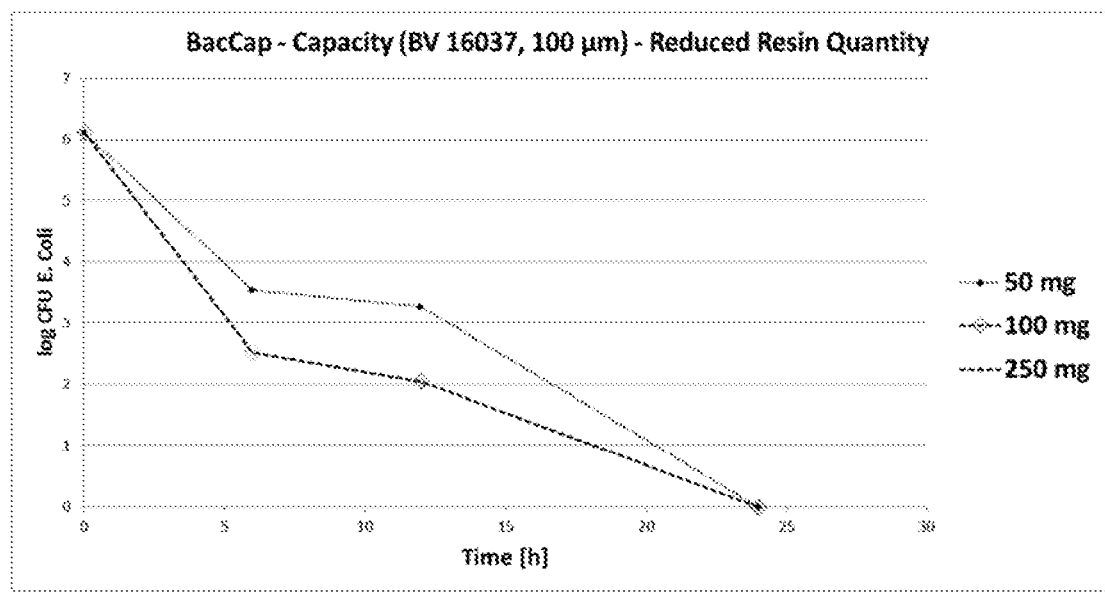
FIG. 9: BacCap-Capacity (BV 16037, 100 µm)-Reduced Resin Quantity

The data (see FIG. 9) do not exhibit any exhaustion of bacterial removal even when the quantity of resin is reduced drastically. Only a slowing down of the removal of bacteria as a function of the quantity of resin could be observed, dependent on the amount of resin used, when using 50 mg of resin, and this differed from the approaches with 100 and 250 mg of resin. The graph curves for the incubation of 100 mg of resin and 250 mg of resin with a corresponding volume of bacteria are shown directly above one another.

The invention claimed is:

1. A method for preparation of biocidal, porous particles from a crosslinked polymer, comprising:
   (a) providing an aqueous suspension containing a polyamine, a crosslinker and a porous inorganic substrate in particulate form at a temperature less than or equal to 10° C. in a mixer for coating of the porous inorganic substrate with the polyamine;
   (b) cross-linking the polyamine in pores of the porous inorganic substrate with simultaneous removal of water;
   (c) dissolving the porous inorganic substrate to obtain the biocidal porous particles of the crosslinked polyamine, wherein the porous inorganic substrate can be dissolved under aqueous alkaline conditions at a pH>10.

2. The method according to claim 1, wherein the steps (a) and (b) are repeated at least once.

3. The method according to claim 1, wherein the cross-linking is done in a stirred reactor.

4. The method according claim 1, wherein the polyamine is in a non-desalinated state.

5. The method according to claim 1, wherein the polyamine is a polyvinylamine.

6. The method according to claim 1, wherein the cross-linked polyamine according to step (c) contains derivatived side groups.

* * * * *